(12) United States Patent
Arii et al.

(10) Patent No.: US 12,312,106 B2
(45) Date of Patent: May 27, 2025

(54) UNMANNED AERIAL VEHICLE STATION

(71) Applicant: Daifuku Co., Ltd., Osaka (JP)

(72) Inventors: Tooru Arii, Tokyo (JP); Tooru Siraisi, Tokyo (JP)

(73) Assignee: Daifuku Co., Ltd., Osaka (JP)

( * ) Notice: Subject to any disclaimer, the term of this patent is extended or adjusted under 35 U.S.C. 154(b) by 0 days.

(21) Appl. No.: 18/239,981

(22) Filed: Aug. 30, 2023

(65) Prior Publication Data

US 2024/0076072 A1 Mar. 7, 2024

(30) Foreign Application Priority Data

Sep. 1, 2022 (JP) .................................. 2022-139478

(51) Int. Cl.
*B64U 70/90* (2023.01)
*B64F 1/222* (2024.01)
*B64U 101/66* (2023.01)

(52) U.S. Cl.
CPC .............. *B64U 70/90* (2023.01); *B64F 1/222* (2013.01); *B64U 2101/66* (2023.01)

(58) Field of Classification Search
CPC ...... B64U 70/90; B64U 2101/66; B64F 1/222
See application file for complete search history.

(56) References Cited

U.S. PATENT DOCUMENTS

2018/0155027 A1* 6/2018 Gil ............................ B64F 1/10
2019/0383052 A1* 12/2019 Blake ...................... B60L 53/30

FOREIGN PATENT DOCUMENTS

JP 2020117876 A 8/2020

* cited by examiner

*Primary Examiner* — Christopher D Hutchens
*Assistant Examiner* — Steven J Shur
(74) *Attorney, Agent, or Firm* — The Webb Law Firm

(57) ABSTRACT

An unmanned aerial vehicle station includes a takeoff-landing unit for an unmanned aerial vehicle to take off and land, a parcel receiver, a parcel deliverer, a storage that stores a plurality of parcels, a replenishment hangar that houses a plurality of unmanned aerial vehicles and replenishes the housed plurality of unmanned aerial vehicles with energy, a parcel transporter that transports the plurality of parcels between the parcel receiver and the storage and between the parcel deliverer and the storage, and an aircraft transporter that transports the plurality of unmanned aerial vehicles between the takeoff-landing unit and the replenishment hangar.

17 Claims, 5 Drawing Sheets

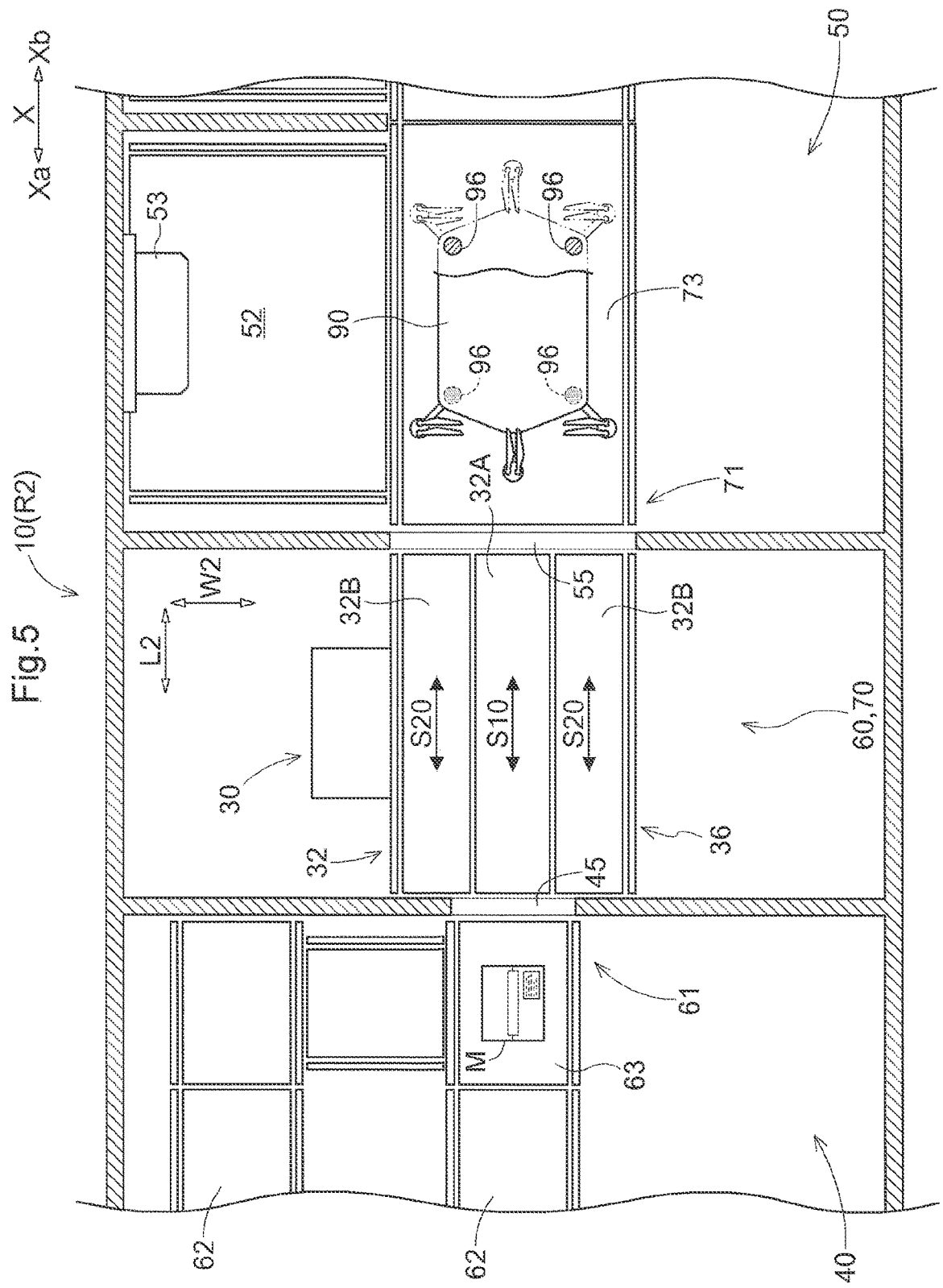

UNMANNED AERIAL VEHICLE STATION

CROSS-REFERENCE TO RELATED APPLICATION

This application claims priority to Japanese Patent Application No. 2022-139478 filed Sep. 1, 2022, the disclosure of which is hereby incorporated by reference in its entirety.

BACKGROUND OF THE INVENTION

Field of the Invention

The present invention relates to an unmanned aerial vehicle (UAV) station for UAVs to take off and land for delivering parcels.

DESCRIPTION OF RELATED ART

UAV stations for UAVs to take off and land are known. Patent Literature 1 (Japanese Unexamined Patent Application Publication No. 2020-117876) describes a station for automatic guided vehicles (AGVs) installed in a building having more than one floor to prevent, during automatic delivery, AGVs from flying over handrails to a destination residence in a gust or from colliding with a structure such as a building. The station is a wellhole-style space in a part of the building, in which an AGV ascends and descends to deliver a parcel to a parcel delivery device on each floor of the building to deliver the parcel to a delivery box assigned to each resident.

A UAV station described in Patent Literature 1 is to be installed in a residential building with a wellhole-style structure through multiple floors and also with parcel delivery devices. However, UAVs have limited use in areas in which residential buildings cannot include such UAV stations or in areas to which UAVs are unreachable over a long distance of parcel delivery due to their insufficient flight range.

SUMMARY OF THE INVENTION

UAV stations that facilitate use of UAVs are thus awaited.

An unmanned aerial vehicle station according to one or more aspects of the present disclosure includes a takeoff-landing unit for an unmanned aerial vehicle to take off and land, a parcel receiver that receives a parcel from the unmanned aerial vehicle, a parcel deliverer that delivers the parcel to the unmanned aerial vehicle, a storage that stores a plurality of parcels, a replenishment hangar that houses a plurality of unmanned aerial vehicles and replenishes the housed plurality of unmanned aerial vehicles with energy, a parcel transporter that transports the plurality of parcels between the parcel receiver and the storage and between the parcel deliverer and the storage, and an aircraft transporter that transports the plurality of unmanned aerial vehicles between the takeoff-landing unit and the replenishment hangar.

This structure can store multiple parcels, and house and replenish multiple UAVs. The UAV station can thus serve as, for example, a temporary housing station for parcels or UAVs to facilitate use of UAVs. The UAV station can also place a parcel received from a UAV onto another replenished UAV and allows the UAV to take off immediately. The UAV station can thus serve as, for example, a station for switching UAVs. The UAV station can also change the order of parcels to be flown with UAVs. The UAV station can thus serve as, for example, a station for changing the delivery order of parcels.

Further features and advantageous effects of the technique according to the present disclosure will be apparent from exemplary and nonlimiting embodiments described below with reference to the drawings.

BRIEF DESCRIPTION OF THE DRAWINGS

FIG. 5 is a plan view of a lifter in a UAV station according to a second embodiment.

DESCRIPTION OF THE INVENTION

First Embodiment

Figure 1:
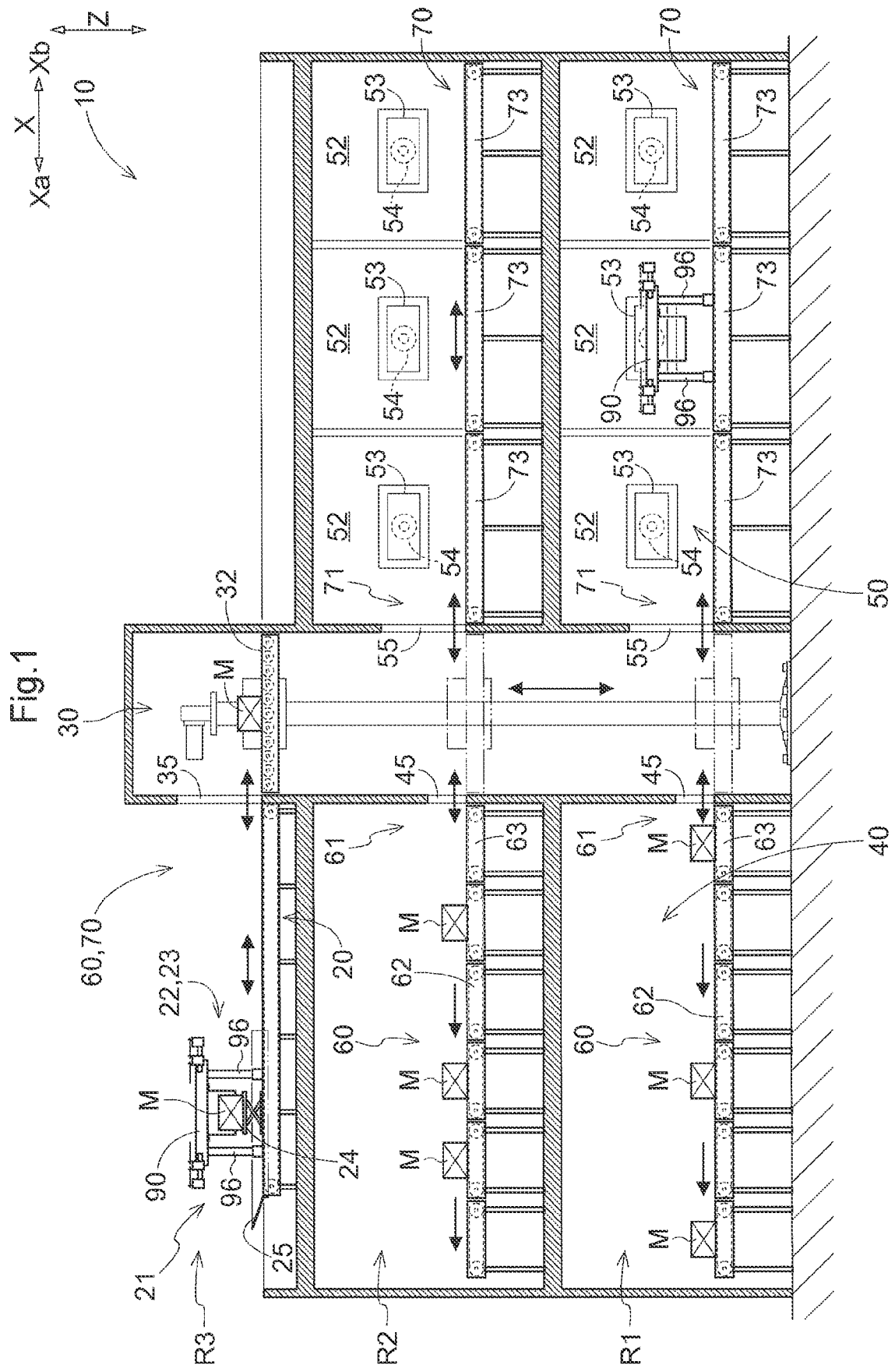
FIG. 1 is a side view of a UAV station according to a first embodiment.
Figure 2:
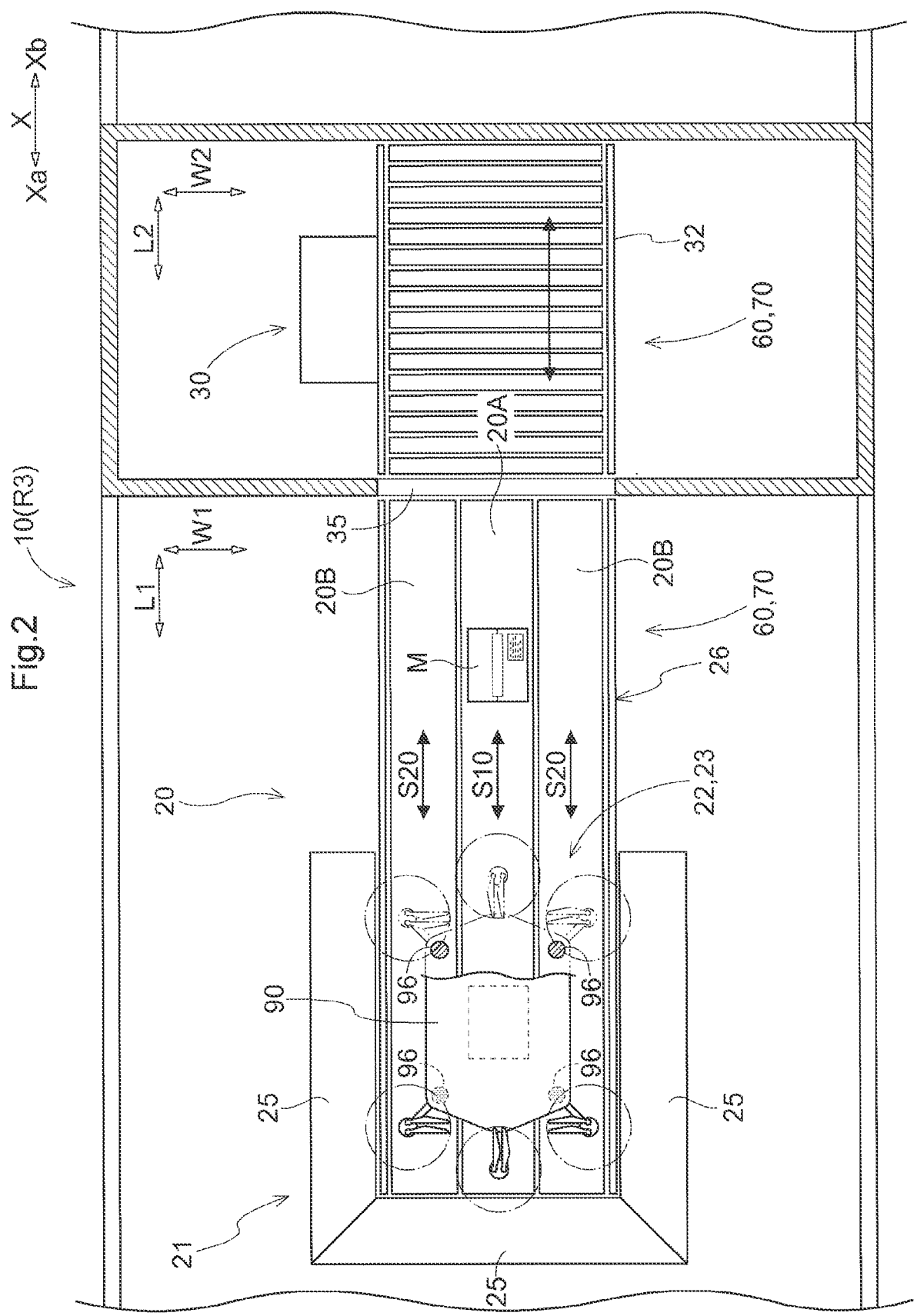
FIG. 2 is a plan view of a rooftop of the UAV station in FIG. 1.
Figure 3:
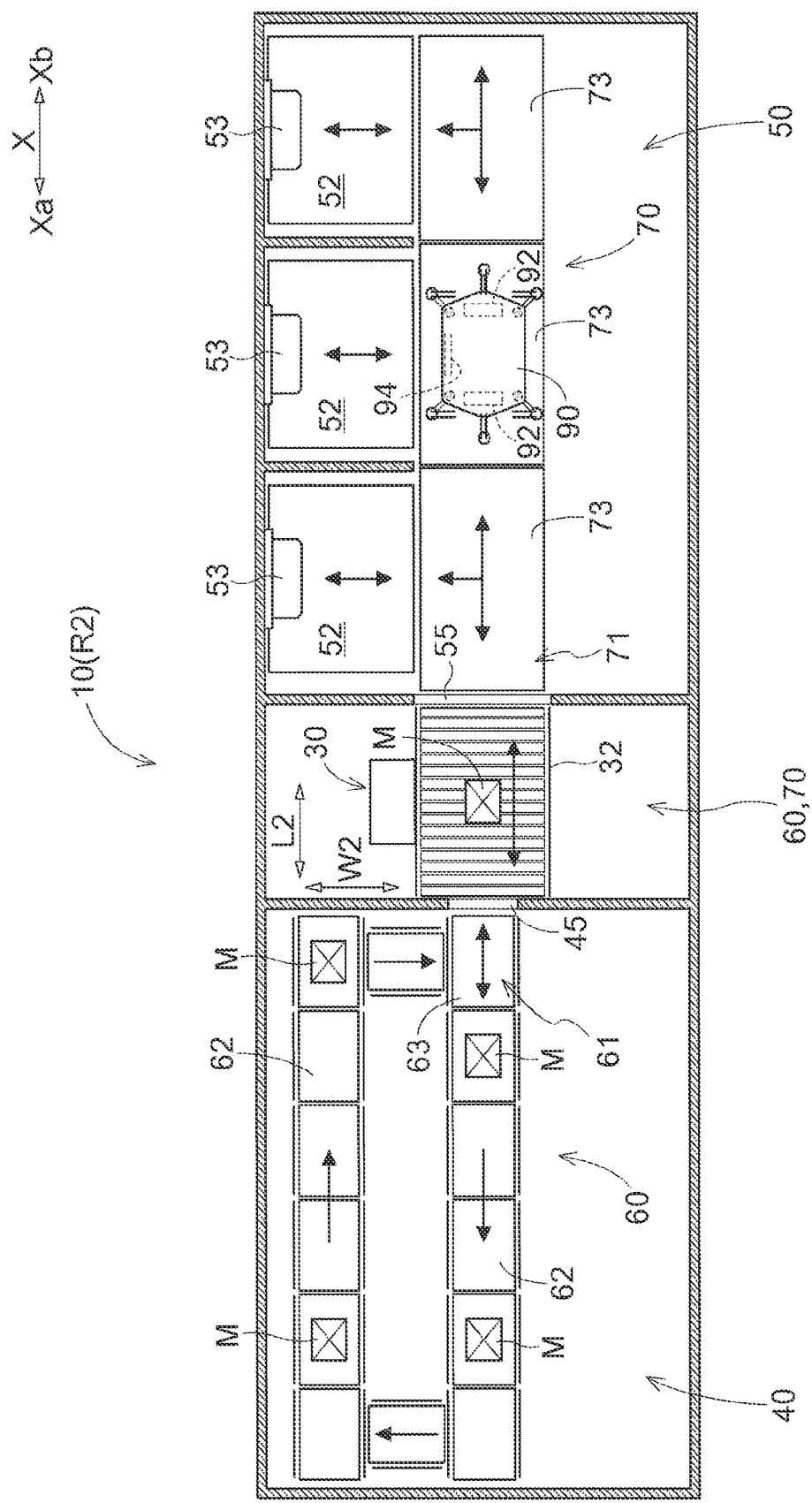
FIG. 3 is a plan view of a second floor of the UAV station in FIG. 1.
Figure 4:
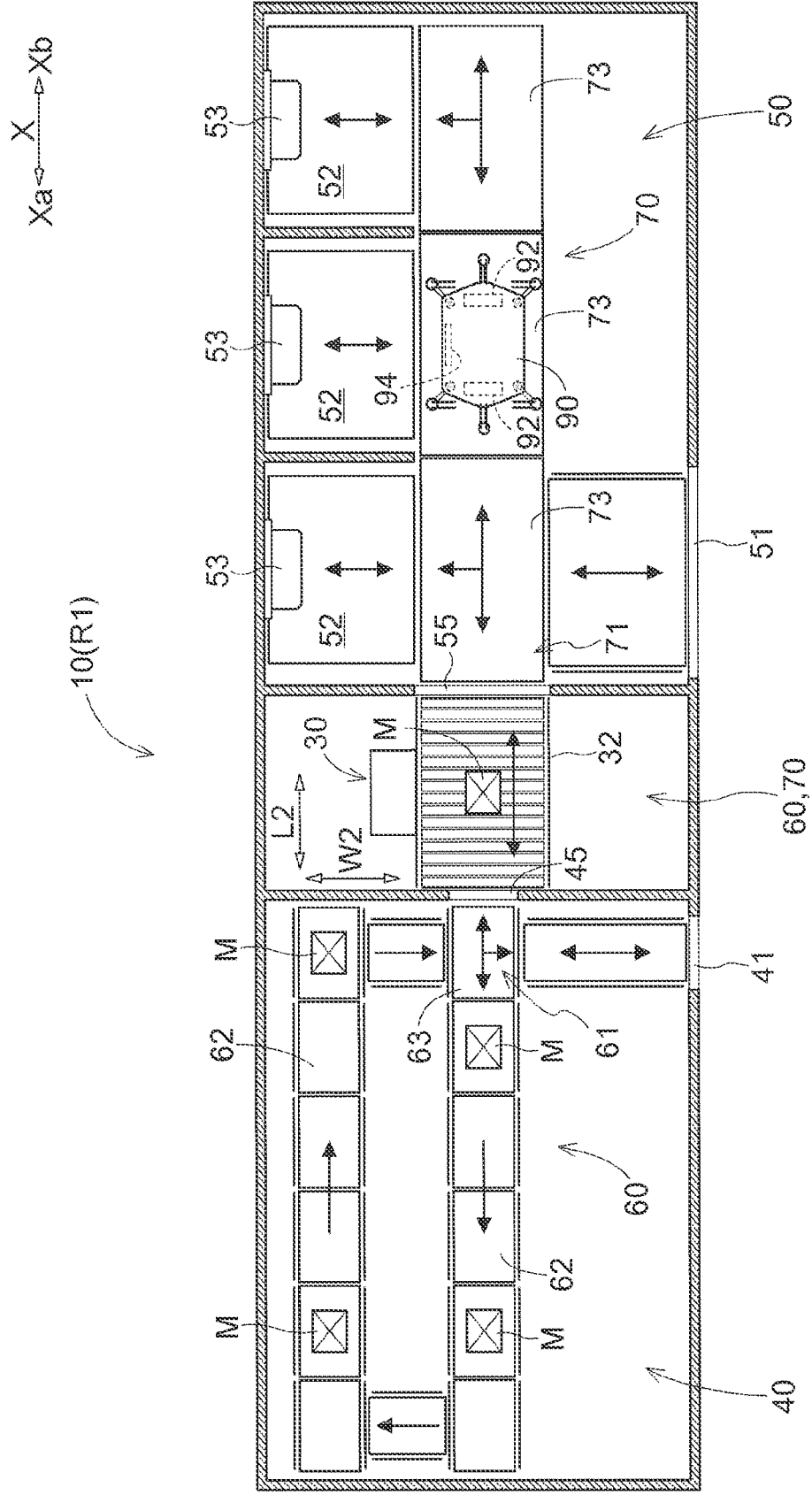
FIG. 4 is a plan view of a first floor of the UAV station in FIG. 1.

An unmanned aerial vehicle (UAV) station 10 according to the present embodiment will now be described with reference to the drawings. FIG. 1 is a cross-sectional view of the UAV station 10. The UAV station 10 includes a takeoff-landing unit 21 for a UAV 90 to take off and land, a parcel receiver 22 that receives a parcel M from a UAV 90, and a parcel deliverer 23 that delivers a parcel M to a UAV 90. The UAV station 10 also includes a storage 40 that stores multiple parcels M and a replenishment hangar 50 that houses and replenishes multiple UAVs with energy (more specifically, energy for flight). The UAV station 10 according to the present embodiment is a single building. FIG. 2 is an enlarged plan view of a rooftop R3 of the UAV station 10. FIG. 3 is a plan view of a second floor R2 of the UAV station 10. FIG. 4 is a plan view of a first floor R1 of the UAV station 10.

The UAV 90 is, for example, a fixed- or rotary-wing aircraft that is remotely controllable or is capable of autonomous flight. The UAV 90 in the present embodiment is a power-operated rotary-wing aircraft that is capable of vertical takeoff and landing. In the example in FIG. 3, the UAV 90 is rechargeable and includes a storage battery 92. The UAV 90 also includes a receiver coil 94. The UAV 90 is a multicopter, or a drone, capable of autonomous flight. The UAV 90 includes contact members 96 as shown in FIGS. 1 and 2. In the example in FIG. 2, the contact members 96 are four legs. The contact members 96 may be sleds or wheels.

The UAV station 10 according to the present embodiment includes an external transporter 20 and a lifter 30. The external transporter 20 in the present embodiment transports the UAV 90 between the takeoff-landing unit 21 and the lifter 30. The vertical direction herein is referred to as a vertical direction Z. The horizontal direction is referred to as a specific direction X. One of two opposing positions in the specific direction X is referred to as a first side Xa in the specific direction, and the other of the two opposing positions in the specific direction X as a second side Xb in the specific direction. As shown in FIG. 2, the direction along the transportation path of the external transporter 20 is referred to as a transport direction L1, and the direction orthogonal to the transport direction L1 when viewed in the vertical direction as a transport width direction W1. The external transporter 20 may be a roller conveyor or a belt conveyor. The external transporter 20 corresponds to a first transporter.

The lifter 30 transports each of the parcel M and the UAV 90 at least in the vertical direction Z. The storage 40 is adjacent to the lifter 30 on the first side Xa in the specific direction. The replenishment hangar 50 is adjacent to the lifter 30 on the second side Xb in the specific direction. In the example in FIG. 2, the lifter 30 includes an internal transporter 32 capable of transporting the parcel M and the UAV 90 in the specific direction X. The direction along the transportation path of the internal transporter 32 is referred to as a transport direction L2, and the direction orthogonal to the transport direction L2 when viewed in the vertical direction is referred to as a transport width direction W2. The internal transporter 32 may be a roller conveyor or a belt conveyor. The lifter 30 corresponds to a second transporter.

The takeoff-landing unit 21 in the present embodiment is above the storage 40 and the replenishment hangar 50. In the example in the figure, the takeoff-landing unit 21 is on the rooftop R3 of the building. The takeoff-landing unit 21 is used for vertical takeoff and landing. The takeoff-landing unit 21 overlaps the storage 40 when viewed in the vertical direction. In the example in FIG. 2, the external transporter 20 also serves as the takeoff-landing unit 21. The takeoff-landing unit 21 includes, on at least its one end in the transport width direction W1, a slope sloping upward in the vertical direction Z at a greater distance from the external transporter 20. The slope 25 facilitates the vertical landing of the UAV 90 on the external transporter 20 and allows the external transporter 20 to be relatively small in the transport width direction W1.

The storage 40 and the replenishment hangar 50 in the present embodiment are inside the building. The takeoff-landing unit 21, the parcel receiver 22, and the parcel deliverer 23 are on the rooftop R3 of the building. In the example in FIG. 4, the UAV station 10 incudes a parcel entrance 41 and a UAV entrance 51 on the first floor R1 of the building. The parcel entrance 41 is used to, for example, store and retrieve the parcel M without the UAV 90. The UAV entrance 51 is used to, for example, maintain and inspect the UAV 90. In the example in FIG. 1, the UAV station 10 is a two-story warehouse, with the first floor R1 being the ground floor. The storage 40 and the replenishment hangar 50 in the UAV station 10 may each be an automated warehouse. An automated warehouse herein refers to a warehouse in which objects to be stored are stored and retrieved automatically.

The parcel deliverer 23 in the present embodiment includes a parcel delivering device 24 that delivers the parcel M to the UAV 90. The parcel deliverer 23 in the present embodiment also serves as the parcel receiver 22, and the parcel delivering device 24 also serves as a parcel receiving device that separates the parcel M from the UAV 90. The parcel delivering device 24 may be a parcel receiving robot or an elevator. The external transporter 20 in the present embodiment also serves as the parcel receiver 22. The external transporter 20 in the present embodiment also serves as the parcel deliverer 23.

The external transporter 20 in the present embodiment is above the storage 40 and the replenishment hangar 50 in the vertical direction Z. The external transporter 20 overlaps the storage 40 when viewed in the vertical direction Z. The external transporter 20 also serves as the parcel receiver 22 and transports the parcel M from immediately below the UAV 90 supported by the takeoff-landing unit 21 to the lifter 30. The external transporter 20 at least performs parcel transportation S10 to transport the parcel M separated from the UAV 90 to the lifter 30 in the horizontal direction and aircraft transportation S20 to transport the UAV 90 separated from the parcel M and landing on the external transporter 20 to the lifter 30 in the horizontal direction.

As shown in FIG. 2, the external transporter 20 in the present embodiment includes a separating transporter 26 to transport the UAV 90 and the parcel M separately when the UAV 90 and the parcel M separated from the UAV 90 are placed on the upper surface of the external transporter 20. In the present embodiment, the aircraft transportation S20 refers to the external transporter 20 transporting the UAV 90 alone with the separating transporter 26. The parcel transportation S10 refers to the external transporter 20 transporting the parcel M alone with the separating transporter 26.

The external transporter 20 in the present embodiment includes an aircraft transportation surface 20B that supports and transports the contact members 96 in the UAV 90 and a parcel transportation surface 20A that supports and transports the parcel M. The aircraft transportation surface 20B and the parcel transportation surface 20A can have different transportation speeds. The parcel transportation surface 20A and the aircraft transportation surface 20B in the present embodiment serve as the separating transporter 26. In the example in the figure, one aircraft transportation surface 20B is adjacent to each side of the parcel transportation surface 20A in the transport width direction W1.

The UAV station 10 includes a parcel transporter 60 that transports the parcel M between the parcel receiver 22 and the storage 40 and between the parcel deliverer 23 and the storage 40. The UAV station 10 also includes an aircraft transporter 70 that transports the UAV 90 between the takeoff-landing unit 21 and the replenishment hangar 50. The parcel transporter 60 and the aircraft transporter 70 in the present embodiment include the external transporter 20 in a shared manner. The parcel transporter 60 and the aircraft transporter 70 in the present embodiment include the lifter 30 in a shared manner.

As shown in FIG. 3, the parcel transporter 60 in the present embodiment includes the external transporter 20, the lifter 30, and a storing transporter 61 that transports the parcel M between the lifter 30 and the storage 40. In the present embodiment, the internal transporter 32 in the lifter 30 described above transports the parcel M to the first side Xa in the specific direction to transport the parcel M to the storage 40. In the example in the figure, a circulating transporter 62 and a branching transporter 63 are inside the storage 40. The parcel M transported from the lifter 30 to the storage 40 is placed on the circulating transporter 62 and stored. The branching transporter 63 transports the parcel M to the circulating transporter 62 or the lifter 30 in a branching manner. In the examples in FIGS. 3 and 4, each floor includes one circulating transporter 62 and one branching transporter 63. The branching transporter 63 on the first floor R1 transports the parcel M to the circulating transporter 62, the lifter 30, or the parcel entrance 41 in a branching manner. In the example in the figure, the internal transporter 32 and the branching transporter 63 serve as the storing transporter 61 that transports the parcel M between the lifter 30 and the storage 40.

In the present embodiment, the building includes multiple floors each including one storage 40. In the example in the figure, a second entrance 45 is between the storage 40 and the lifter 30. With the storing transporter 61 to store and transport the parcel M in the storage 40, the storage 40 serves as an automated warehouse for the parcel M.

As shown in FIG. 3, the aircraft transporter 70 in the present embodiment includes the external transporter 20, the lifter 30, and a housing transporter 71 that transports the UAV 90 between the lifter 30 and the replenishment hangar 50. In the present embodiment, the internal transporter 32 in the lifter 30 described above transports the UAV 90 to the second side Xb in the specific direction to transport the UAV 90 to the replenishment hangar 50. In the example in the figure, a branching transporter 73 is inside the replenishment hangar 50. The UAV 90 transported from the lifter 30 to the replenishment hangar 50 is transported to the hangar 52 (described later) or the lifter 30 in a branching manner by the branching transporter 73. In the example in FIGS. 3 and 4, each floor includes one branching transporter 73. The housing transporter 71 on the first floor R1 can transport the UAV 90 to the UAV entrance 51. In the example in the figure, the internal transporter 32 and the branching transporter 73 serve as the housing transporter 71 that transports the UAV 90 between the lifter 30 and the replenishment hangar 50.

In the present embodiment, multiple floors of the building include one replenishment hangar 50. In the example in the figure, a third entrance 55 is between the replenishment hangar 50 and the lifter 30. With the housing transporter 71 to transport the UAV 90 in the replenishment hangar 50, the replenishment hangar 50 serves as an automated warehouse for the UAV 90.

The replenishment hangar 50 in the present embodiment includes multiple hangars 52. Each hangar 52 includes a wireless charger 53. The charger 53 includes a feeder coil 54 and supplies power to the storage battery 92 through the receiver coil 94 in the UAV 90 housed in the hangar 52. This allows wireless charging of the UAV 90 housed in the replenishment hangar 50. As described above, the replenishment hangar 50 in the present embodiment replenishes the UAV 90 with energy by recharging the storage battery 92. In the example in the figure, the floor of the hangar 52 can transport the UAV 90 between the hangar 52 and the branching transporter 73.

Second Embodiment

A UAV station 10 according to a second embodiment will now be described with reference to the drawings. In the present embodiment, unlike in the first embodiment described above, no separating transporter 26 is installed on the rooftop R3, and instead a separating transporter 36 is in the lifter 30. The UAV station 10 according to the present embodiment will be described below focusing on these differences from the UAV station 10 according to the first embodiment. The components not described herein are the same as those in the first embodiment. FIG. 5 is an enlarged plan view of a second floor R2 of the UAV station 10 according to the second embodiment.

The lifter 30 in the present embodiment also serves as the parcel receiver 22. The lifter 30 includes, for example, the internal transporter 32 with its upper surface including an impact absorbing material or a parcel receiving device (not shown) and thus can receive the parcel M from the UAV 90. The external transporter 20 in the present embodiment also serves as the parcel deliverer 23 with the parcel delivering device 24, but does not serve as the parcel receiver 22.

In the present embodiment, the internal transporter 32 in the lifter 30 performs parcel transportation S10 to transport the parcel M separated from the UAV 90 to the first side Xa in the specific direction and an aircraft transportation S20 to transport the UAV 90 separated from the parcel M to the second side Xb in the specific direction. The internal transporter 32 in the present embodiment includes the separating transporter 36 to transport the UAV 90 and the parcel M separately when the UAV 90 and the parcel M separated from the UAV 90 are placed on the upper surface of the internal transporter 32.

The internal transporter 32 in the present embodiment includes an aircraft transportation surface 32B that supports and transports the contact members 96 in the UAV 90 and a parcel transportation surface 32A that supports and transports the parcel M. The aircraft transportation surface 32B and the parcel transportation surface 32A can have different transportation speeds. In the example in the figure, one aircraft transportation surface 32B is adjacent to each side of the parcel transportation surface 32A in the transport width direction W1. The parcel transportation surface 32A supports and transports the parcel M separated from the UAV 90 to the first side Xa in the specific direction. The aircraft transportation surface 32B supports and transports the UAV 90 separated from the parcel M to the second side Xb in the specific direction.

The parcel transportation surface 32A and the aircraft transportation surface 32B in the present embodiment serve as the separating transporter 36 described above. The parcel transportation S10 described above refers to the internal transporter 32 transporting the UAV 90 alone with the separating transporter 36. The aircraft transportation S20 described above refers to the internal transporter 32 transporting the parcel M alone with the separating transporter 36. As described above, the lifter 30 in the present embodiment includes the separating transporter 36. This simplifies the structure and allows the parcel receiver 22 and the separating transporter 36 to be indoors.

OTHER EMBODIMENTS

A UAV station 10 according to other embodiments will now be described.

(1) The UAV 90 in the above embodiments is a rechargeable rotary-wing aircraft capable of vertical takeoff and landing. However, the UAV 90 is not limited to such an example and may be, for example, a power-operated rotary- or fixed-wing aircraft with fuel cells.

(2) The replenishment hangar 50 in the above embodiments includes the wireless charger 53. However, the replenishment hangar 50 is not limited to such an example and may include, for example, a wired charger 53. The replenishment hangar 50 may replenish fuel cells in the UAV 90 with fuel. In this case, the replenishment hangar 50 replenishes the UAV 90 with energy by replenishing the UAV 90 with fuel that serves as an energy source (e.g., by filling a hydrogen storage container with hydrogen).

(3) The UAV station 10 in the above embodiments is a two-story building above ground. However, the UAV station 10 is not limited to such an example and may be, for example, a multi-story building with a basement, or a facility with the parcel transporter 60 and the aircraft transporter 70 including multiple buildings in a shared manner. The first floor R1 may be above or below the ground floor and includes the parcel entrance 41 and the UAV entrance 51. The parcel entrance 41 and the UAV entrance 51 may be located on different floors.

(4) The parcel transporter 60 and the aircraft transporter 70 in the above embodiments include the lifter 30 as the second transporter in a shared manner. However, the parcel transporter 60 and the aircraft transporter 70 are not limited to such examples and may each include a lifter 30. The UAV station 10 may be a single-story building above ground, and the parcel transporter 60 may be a stacker crane that transports the parcel M to each of multiple levels of a storage shelf that serves as the storage 40. The aircraft transporter 70 may be a stacker crane that transports the UAV 90 to each of multiple levels of a housing shelf that serves as the replenishment hangar 50. The parcel transporter 60 and the aircraft transporter 70 may each include a stacker crane or include a stacker crane in a shared manner.

(5) The storage 40 in the above embodiments is adjacent to the lifter 30 on the first side Xa in the specific direction, and the replenishment hangar 50 is adjacent to the lifter 30 on the second side Xb in the specific direction. However, the storage 40 and the replenishment hangar 50 are not limited to such examples and may both be located, for example, on the second side Xb in the specific direction with respect to and away from the lifter 30. The storing transporter 61 and the housing transporter 71 may be automatic guided vehicles (AGVs) that travel between the storage 40, the replenishment hangar 50, and the lifter 30.

(6) The external transporter 20 in the above embodiments is on the rooftop R3 and also serves as the takeoff-landing unit 21. However, the external transporter 20 is not limited to such an example and may be located downstream from the takeoff-landing unit 21 that also serves as the parcel receiver 22. The external transporter 20 may also not overlap the storage 40 when viewed in the vertical direction. The takeoff-landing unit 21 may be a platform or a hanger that hangs the UAV 90. The takeoff-landing unit 21 may include a takeoff unit and a landing unit installed at different locations, or include takeoff units and landing units installed at multiple locations. The parcel deliverer 23 may be on the first floor R1 instead of the rooftop R3. Multiple parcel receivers 22 may be installed at different locations. Multiple parcel deliverers 23 may be installed at different locations. The external transporter 20 that also serves as the takeoff-landing unit 21 may be indoors on the first floor R1 or on a balcony on the second floor R2.

(7) The external transporter 20 in the above first embodiment also serves as the parcel receiver 22 and the parcel deliverer 23 and includes the parcel delivering device 24 that also serves as the parcel receiving device. However, the parcel receiver 22 and the parcel deliverer 23 are not limited to such an example, and may not include the parcel delivering device 24. Instead, a worker may receive and deliver parcels. The parcel receiver 22 may be a parcel stand without the parcel receiving device.

(8) The external transporter 20 in the above first embodiment includes the parcel transportation surface 20A and the aircraft transportation surface 20B. However, the external transporter 20 is not limited to such an example and may transport the parcel M while the UAV 90 is held by the separating transporter 26 in the transport direction L1. The external transporter 20 may not include the parcel transportation surface 20A or the aircraft transportation surface 20B and may transport the parcel M while the UAV 90 is held by the first entrance 35 in FIG. 2 with a changeable width in the transport width direction W2 in the transport direction L1. In other words, the first entrance 35 included in the lifter 30 or the external transporter 20 may serve as the separating transporter 26.

(9) The internal transporter 32 in the above second embodiment includes the parcel transportation surface 32A and the aircraft transportation surface 32B. However, the internal transporter 32 is not limited to such an example and may transport the parcel M while the UAV 90 is held by the separating transporter 36 in the transport direction L2. The internal transporter 32 may not include the parcel transportation surface 32A or the aircraft transportation surface 32B and, as shown in FIGS. 3 to 5, may transport the parcel M while the UAV 90 is held, in the transport direction L2, by the second entrance 45 between the lifter 30 and the storage 40 with a width in the transport width direction W2 smaller than the UAV 90. In other words, the second entrance included in the lifter 30 or the storage 40 may serve as the separating transporter 36.

(10) The structure described in each of the above embodiments may be combined with any other structures described in the other embodiments unless any contradiction arises. The embodiments described herein are merely illustrative in all aspects and may be modified variously as appropriate without departing from the spirit and scope of the present disclosure.

OVERVIEW OF EMBODIMENTS

Hereafter, the UAV station will be described.

An unmanned aerial vehicle station according to one or more embodiments of the present disclosure includes a takeoff-landing unit for an unmanned aerial vehicle to take off and land, a parcel receiver that receives a parcel from the unmanned aerial vehicle, a parcel deliverer that delivers the parcel to the unmanned aerial vehicle, a storage that stores a plurality of parcels, a replenishment hangar that houses a plurality of unmanned aerial vehicles and replenishes the housed plurality of unmanned aerial vehicles with energy, a parcel transporter that transports the plurality of parcels between the parcel receiver and the storage and between the parcel deliverer and the storage, and an aircraft transporter that transports the plurality of unmanned aerial vehicles between the takeoff-landing unit and the replenishment hangar.

This structure can store multiple parcels, and house and replenish multiple UAVs. The UAV station can thus serve as, for example, a temporary housing station for parcels or UAVs to facilitate use of UAVs. The UAV station can also place a parcel received from a UAV onto another replenished UAV and allows the UAV to take off immediately. The UAV station can thus serve as, for example, a station for switching UAVs. The UAV station can also change the order of parcels to be flown with UAVs. The UAV station can thus serve as, for example, a station for changing the delivery order of parcels.

In one embodiment, the takeoff-landing unit may be above the storage and the replenishment hangar. The parcel transporter and the aircraft transporter may include a lifter in a shared manner. The lifter may transport the plurality of parcels and the plurality of unmanned aerial vehicles in a vertical direction. The storage may be adjacent to the lifter and may be located on a first side in a specific direction. The replenishment hangar may be adjacent to the lifter and may be located on a second side in the specific direction, where the specific direction is a horizontal direction, the first side in the specific direction is one of two opposing positions in the specific direction, and the second side in the specific direction is the other of the two opposing positions in the specific direction.

This structure can store the parcel in the storage by transporting the parcel from the lifter to the first side in the specific direction and house the UAV in the replenishment hangar by transporting the UAV to the second side in the specific direction. The UAV station thus can store multiple parcels and house multiple UAVs as appropriate.

In one embodiment, the parcel transporter and the aircraft transporter may include a first transporter and a second transporter in a shared manner. The first transporter may be above the storage and the replenishment hangar, serve as the takeoff-landing unit and the parcel receiver, transport the plurality of parcels separated from the plurality of unmanned aerial vehicles to the second transporter at least in the horizontal direction, and transport, to the second transporter at least in the horizontal direction, the plurality of unmanned aerial vehicles separated from the plurality of parcels and landing on the first transporter. The second transporter may transport the plurality of parcels and the plurality of unmanned aerial vehicles at least in the vertical direction.

This structure can store multiple parcels and multiple UAVs in a space below the takeoff-landing unit. With the first transporter also serving as the takeoff-landing unit and the parcel receiver, this structure is simpler. With the first transporter capable of transporting the parcel and transporting the UAV, this structure can separate a parcel from a UAV and transport each of the parcel and the UAV quickly.

In one embodiment, the first transporter may overlap the storage when viewed in the vertical direction.

This structure can store a sufficient number of parcels, house a sufficient number of UAVs, and reduce the area of the UAV station when viewed in plan.

In one embodiment, the storage and the replenishment hangar may be inside a warehouse. The takeoff-landing unit, the parcel receiver, and the parcel deliverer may be on a rooftop of the warehouse.

This structure allows UAVs to easily take off and land as well as to easily receive and deliver parcels.

What is claimed is:

1. An unmanned aerial vehicle station, comprising:
   a takeoff-landing unit for an unmanned aerial vehicle to take off and land;
   a parcel receiver configured to receive a parcel from the unmanned aerial vehicle;
   a parcel deliverer configured to deliver the parcel to the unmanned aerial vehicle;
   a storage configured to store a plurality of parcels;
   a replenishment hangar configured to house a plurality of unmanned aerial vehicles and replenish the housed plurality of unmanned aerial vehicles with energy;
   a parcel transporter configured to transport the plurality of parcels between the parcel receiver and the storage and between the parcel deliverer and the storage; and
   an aircraft transporter configured to transport the plurality of unmanned aerial vehicles between the takeoff-landing unit and the replenishment hangar, wherein
   the takeoff-landing unit is above the storage and the replenishment hangar,
   the parcel transporter and the aircraft transporter comprise a lifter in a shared manner,
   the lifter transports the plurality of parcels and the plurality of unmanned aerial vehicles in a vertical direction,
   the storage is adjacent to the lifter and is located on a first side in a specific direction,
   the replenishment hangar is adjacent to the lifter and is located on a second side in the specific direction,
   the specific direction is a horizontal direction, the first side in the specific direction is one of two opposing positions in the specific direction, and the second side in the specific direction is the other of the two opposing positions in the specific direction,
   the parcel transporter comprises a storing transporter configured to transport the parcel, separated from the unmanned aerial vehicle, between the lifter and the storage in the specific direction, and
   the aircraft transporter comprises a housing transporter configured to transport the unmanned aerial vehicle, separated from the parcel, between the lifter and the replenishment hangar in the specific direction.

2. The unmanned aerial vehicle station according to claim 1, wherein
   the parcel transporter and the aircraft transporter comprise a first transporter and a second transporter in a shared manner,
   the first transporter is above the storage and the replenishment hangar, serves as the takeoff-landing unit and the parcel receiver, transports the plurality of parcels separated from the plurality of unmanned aerial vehicles to the second transporter at least in the horizontal direction, and transports, to the second transporter at least in the horizontal direction, the plurality of unmanned aerial vehicles separated from the plurality of parcels and landing on the first transporter, and
   the second transporter transports the plurality of parcels and the plurality of unmanned aerial vehicles at least in the vertical direction.

3. The unmanned aerial vehicle station according to claim 2, wherein the first transporter overlaps the storage when viewed in the vertical direction.

4. The unmanned aerial vehicle station according to claim 1, wherein
   the storage and the replenishment hangar are inside a building, and
   the takeoff-landing unit, the parcel receiver, and the parcel deliverer are on a rooftop of the building.

5. The unmanned aerial vehicle station according to claim 1, further comprising an unmanned aerial vehicle entrance, wherein the housing transporter is an indoor transporter and configured to transport the unmanned aerial vehicle having wings between the replenishment hangar and the unmanned aerial vehicle entrance.

6. The unmanned aerial vehicle station according to claim 1, further comprising a first transporter above the storage and the replenishment hangar and configured to transport the unmanned aerial vehicle and the parcel between the takeoff-landing unit and the lifter in the specific direction.

7. The unmanned aerial vehicle station according to claim 1, further comprising a separating transporter configured to transport the unmanned aerial vehicle and the parcel separately when the unmanned aerial vehicle and the parcel separated from the unmanned aerial vehicle are placed on a transportation surface.

8. The unmanned aerial vehicle station according to claim 7, wherein the separating transporter comprises:
   an aircraft transportation surface configured to support and transport a contact member in the unmanned aerial vehicle; and
   a parcel transportation surface configured to support and transport the parcel, the aircraft transportation surface and the parcel transportation surface being able to have different transportation speeds.

9. The unmanned aerial vehicle station according to claim 7, wherein the lifter or a first transporter above the storage and the replenishment hangar and configured to transport the unmanned aerial vehicle and the parcel between the takeoff-landing unit and the lifter comprises the separating transporter.

10. An unmanned aerial vehicle station, comprising:
a takeoff-landing unit for an unmanned aerial vehicle with wings to take off and land;
a parcel receiver configured to receive a parcel from the unmanned aerial vehicle;
a parcel deliverer configured to deliver the parcel to the unmanned aerial vehicle;
a storage configured to store a plurality of parcels;
a replenishment hangar configured to house a plurality of unmanned aerial vehicles having the wings and replenish the housed plurality of unmanned aerial vehicles having the wings with energy;
a parcel transporter configured to transport the plurality of parcels between the parcel receiver and the storage and between the parcel deliverer and the storage; and
an aircraft transporter configured to transport the plurality of unmanned aerial vehicles having the wings between the takeoff-landing unit and the replenishment hangar, wherein
the takeoff-landing unit is above the storage and the replenishment hangar,
the parcel transporter and the aircraft transporter comprise a lifter in a shared manner,
the lifter transports the plurality of parcels and the plurality of unmanned aerial vehicles having the wings in a vertical direction,
the storage is adjacent to the lifter and is located on a first side in a specific direction, and
the replenishment hangar is adjacent to the lifter and is located on a second side in the specific direction,
the specific direction is a horizontal direction and the first side in the specific direction is one of two opposing positions in the specific direction, and
the second side in the specific direction is the other of the two opposing positions in the specific direction.

11. The unmanned aerial vehicle station according to claim 10, further comprising a first transporter above the storage and the replenishment hangar and configured to transport the unmanned aerial vehicle having the wings and the parcel between the takeoff-landing unit and the lifter in the specific direction.

12. The unmanned aerial vehicle station according to claim 10, further comprising a separating transporter configured to transport the unmanned aerial vehicle having the wings and the parcel separately when the unmanned aerial vehicle having the wings and the parcel separated from the unmanned aerial vehicle having the wings are placed on a transportation surface.

13. The unmanned aerial vehicle station according to claim 12, wherein the separating transporter comprises an aircraft transportation surface configured to support and transport a contact member in the unmanned aerial vehicle having the wings and a parcel transportation surface configured to support and transport the parcel, the aircraft transportation surface and the parcel transportation surface being able to have different transportation speeds.

14. The unmanned aerial vehicle station according to claim 12, wherein the lifter or a first transporter above the storage and the replenishment hangar and configured to transport the unmanned aerial vehicle having the wings and the parcel between the takeoff-landing unit and the lifter comprises the separating transporter.

15. An unmanned aerial vehicle station, comprising:
a takeoff-landing unit for an unmanned aerial vehicle to take off and land;
a parcel receiver configured to receive a parcel from the unmanned aerial vehicle;
a parcel deliverer configured to deliver the parcel to the unmanned aerial vehicle;
a storage configured to store a plurality of parcels;
a replenishment hangar configured to house a plurality of unmanned aerial vehicles and replenish the housed plurality of unmanned aerial vehicles with energy;
a parcel transporter configured to transport the plurality of parcels between the parcel receiver and the storage and between the parcel deliverer and the storage;
an aircraft transporter configured to transport the plurality of unmanned aerial vehicles between the takeoff-landing unit and the replenishment hangar; and
a separating transporter configured to transport the unmanned aerial vehicle and the parcel separately when the unmanned aerial vehicle and the parcel separated from the unmanned aerial vehicle are placed on a transportation surface.

16. The unmanned aerial vehicle station according to claim 15, wherein the separating transporter comprises an aircraft transportation surface configured to support and transport a contact member in the unmanned aerial vehicle and a parcel transportation surface configured to support and transport the parcel, the aircraft transportation surface and the parcel transportation surface being able to have different transportation speeds.

17. The unmanned aerial vehicle station according to claim 15, wherein the lifter or a first transporter above the storage and the replenishment hangar and configured to transport the unmanned aerial vehicle and the parcel between the takeoff-landing unit and the lifter comprises the separating transporter.

* * * * *

UNITED STATES PATENT AND TRADEMARK OFFICE
CERTIFICATE OF CORRECTION

PATENT NO. : 12,312,106 B2  
APPLICATION NO. : 18/239981  
DATED : May 27, 2025  
INVENTOR(S) : Tooru Arii Page 1 of 1

It is certified that error appears in the above-identified patent and that said Letters Patent is hereby corrected as shown below:

In the Claims

Column 10, Line 15, Claim 2, delete "wherein" and insert -- wherein: --

Column 10, Line 32, Claim 3, delete "wherein" and insert -- wherein: --

Column 10, Line 35, Claim 4, delete "wherein" and insert -- wherein: --

Signed and Sealed this  
Twenty-second Day of July, 2025

Coke Morgan Stewart  
*Acting Director of the United States Patent and Trademark Office*